United States Patent
Lee et al.

(10) Patent No.: US 12,548,771 B2
(45) Date of Patent: Feb. 10, 2026

(54) LITHIUM SECONDARY BATTERY, BATTERY MODULE AND BATTERY PACK

(71) Applicant: LG Energy Solution, Ltd., Seoul (KR)

(72) Inventors: Su Min Lee, Daejeon (KR); Sun Young Shin, Daejeon (KR); Yong Ju Lee, Daejeon (KR); Bumgi Heo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 13 days.

(21) Appl. No.: 18/229,940

(22) Filed: Aug. 3, 2023

(65) Prior Publication Data

US 2024/0120478 A1  Apr. 11, 2024

(30) Foreign Application Priority Data

Aug. 4, 2022 (KR) .......... 10-2022-0097491
Jul. 14, 2023 (KR) .......... 10-2023-0091528

(51) Int. Cl.
```
H01M 4/525      (2010.01)
H01M 4/02       (2006.01)
H01M 4/505      (2010.01)
H01M 4/583      (2010.01)
H01M 4/62       (2006.01)
H01M 10/052     (2010.01)
```

(52) U.S. Cl.
CPC .......... *H01M 4/525* (2013.01); *H01M 4/505* (2013.01); *H01M 4/583* (2013.01); *H01M 4/622* (2013.01); *H01M 4/625* (2013.01); *H01M 10/052* (2013.01); *H01M 2004/021* (2013.01); *H01M 2004/027* (2013.01); *H01M 2004/028* (2013.01)

(58) Field of Classification Search
CPC ...... H01M 4/525; H01M 4/505; H01M 4/583; H01M 4/622; H01M 4/625; H01M 10/052; H01M 2004/021; H01M 2004/027; H01M 2004/028
See application file for complete search history.

(56) References Cited

U.S. PATENT DOCUMENTS

| 2009/0011334 | A1* | 1/2009 | Shizuka | H01M 4/505 |
| | | | | 429/231.95 |
| 2015/0318537 | A1 | 11/2015 | Nishio et al. | |
| 2016/0211507 | A1* | 7/2016 | Sharma | H01M 4/0402 |
| 2016/0276668 | A1 | 9/2016 | Nagayama et al. | |
| 2017/0040602 | A1 | 2/2017 | Ha et al. | |
| 2017/0084919 | A1* | 3/2017 | Kao | H01M 4/362 |
| 2017/0346079 | A1* | 11/2017 | Friend | H01M 4/587 |
| 2019/0140308 | A1* | 5/2019 | Ohsawa | H01M 4/386 |
| 2019/0214628 | A1* | 7/2019 | Choi | C01G 53/006 |
| 2020/0006801 | A1* | 1/2020 | Cao | H01M 10/0525 |
| 2021/0013493 | A1 | 1/2021 | Cho et al. | |
| 2021/0020902 | A1 | 1/2021 | Yoo et al. | |
| 2021/0151751 | A1* | 5/2021 | Guan | H01M 4/525 |
| 2021/0167366 | A1* | 6/2021 | Leng | H01M 4/366 |
| 2021/0184216 | A1* | 6/2021 | Oh | H01M 4/587 |
| 2021/0249657 | A1* | 8/2021 | Shin | H01M 4/0435 |
| 2021/0384502 | A1 | 12/2021 | Lee et al. | |
| 2021/0408537 | A1* | 12/2021 | Hwang | C01G 53/50 |
| 2022/0059821 | A1 | 2/2022 | Park et al. | |
| 2022/0102731 | A1 | 3/2022 | You et al. | |
| 2022/0140320 | A1* | 5/2022 | Jin | H01M 4/625 |
| | | | | 429/223 |
| 2022/0285678 | A1 | 9/2022 | Takahashi et al. | |
| 2022/0416238 | A1 | 12/2022 | Baek et al. | |
| 2023/0155123 | A1* | 5/2023 | Lee | C01G 53/50 |
| | | | | 429/223 |
| 2023/0216025 | A1 | 7/2023 | Takeda et al. | |
| 2023/0238521 | A1 | 7/2023 | Teshima et al. | |

FOREIGN PATENT DOCUMENTS

| CN | 109509909 | A | | 3/2019 | |
| CN | 112186138 | A | * | 1/2021 | ............. C01G 53/42 |
| CN | 112736227 | A | * | 4/2021 | |
| EP | 3890060 | A1 | | 10/2021 | |
| JP | 20130012336 | A | | 1/2013 | |
| JP | 2016115403 | A | | 6/2016 | |
| JP | 2022064294 | A | | 4/2022 | |

(Continued)

OTHER PUBLICATIONS

International Search Report for PCT/KR2023/010467 mailed Oct. 31, 23. 4 pages. (see p. 2-3 categorizing the cited references).
Decision of Rejection for Korean Application No. 10-2023-0091528 mailed Feb. 17, 2024. 4 pages.
Notice of Allowance for Korean Application No. 10-2023-0091528 mailed Jun. 26, 2024. 3 pages.
Notice of Preliminary Rejection for Korean Application No. 10-2023-0091528 mailed Aug. 11, 2023. 6 pages.
Extended European Search Report including Written Opinion for Application No. 23850309.8 dated Jun. 24, 2025. 6 pages.

*Primary Examiner* — Ula C Ruddock
*Assistant Examiner* — Olivia Mason Ruggiero
(74) *Attorney, Agent, or Firm* — Lerner David LLP

(57) ABSTRACT

A lithium secondary battery includes a cathode having a cathode active material, an anode having an anode active material, a separator, and an electrolyte. The cathode active material comprises a lithium composite transition metal compound having Ni, Co, and Mn, and has single particles and/or pseudo-single particles. Each single particle consists of one nodule, and each pseudo-single crystal is a composite of 30 or fewer nodules. The single particles and/or pseudo-single particles have an average particle diameter (D50) of 1 μm or more. The anode active material has a silicon carbon composite having an average particle diameter (D50) of more than 1 μm. The average particle diameter (D50) of the single particles and/or pseudo-single particles is smaller than the average particle diameter (D50) of the silicon carbon composite.

20 Claims, No Drawings

(56) References Cited

FOREIGN PATENT DOCUMENTS

| | | | | |
|---|---|---|---|---|
| KR | 20170018208 A | | 2/2017 | |
| KR | 20190117199 A | | 10/2019 | |
| KR | 20200044448 A | * | 4/2020 | ............. H01M 4/62 |
| KR | 20200089239 A | | 7/2020 | |
| KR | 20210007273 A | | 1/2021 | |
| KR | 20210047755 A | | 4/2021 | |
| KR | 20210070933 A | | 6/2021 | |
| KR | 20210112059 A | * | 9/2021 | |
| KR | 20210150863 A | | 12/2021 | |
| KR | 20220020407 A | | 2/2022 | |
| KR | 20220023419 A | | 3/2022 | |
| KR | 102691204 B1 | | 8/2024 | |
| WO | 2014068931 A1 | | 5/2014 | |
| WO | 2021039751 A1 | | 3/2021 | |
| WO | 2021241750 A1 | | 12/2021 | |

* cited by examiner

LITHIUM SECONDARY BATTERY, BATTERY MODULE AND BATTERY PACK

CROSS-REFERENCE TO RELATED APPLICATIONS

This application claims priority to and the benefit of Korean Patent Application No. 10-2022-0097491 filed in the Korean Intellectual Property Office on Aug. 4, 2022 and Korean Patent Application No. 10-2023-0091528 filed in the Korean Intellectual Property Office on Jul. 14, 2023, the entire contents of which are incorporated herein by reference.

TECHNICAL FIELD

The present disclosure relates to a lithium secondary battery, a battery module and a battery pack.

BACKGROUND ART

Recently, with the rapid spread of electronic devices using batteries, such as not only mobile phones, notebook-sized computers, and electric vehicles, but also power tools and cleaners, the demand for small and lightweight secondary batteries having relatively high capacity and/or high output is rapidly increasing. In particular, lithium secondary batteries are lightweight and have high energy density, and thus have attracted attention as driving power sources for electronic devices. Accordingly, research and development efforts to improve the performance of lithium secondary batteries have been actively conducted.

The lithium secondary battery generates electric energy by oxidation and reduction reactions during intercalation and deintercalation of lithium ions at a cathode and an anode in a state in which an organic electrolytic solution or polymer electrolytic solution is filled between the cathode and the anode, which are composed of active materials capable of intercalating and deintercalating lithium ions.

Lithium cobalt oxide ($LiCoO_2$), lithium nickel oxide ($LiNiO_2$), lithium manganese oxide ($LiMnO_2$, $LiMn_2O_4$, and the like), a lithium iron phosphate compound ($LiFePO_4$) and the like have been used as a cathode active material of a lithium secondary battery. Among them, lithium cobalt oxide ($LiCoO_2$) is widely used because of advantages of high operating voltage and excellent capacity characteristics, and is applied as a high voltage cathode active material. However, due to rising prices and unstable supply of cobalt (Co), there is a limit to its large-scale usage as a power source in fields such as electric vehicles, so there is an emerging need for developing a cathode active material capable of replacing cobalt.

Accordingly, a nickel-cobalt-manganese-based lithium composite transition metal compound (hereinafter simply referred to as 'NCM-based lithium composite transition metal compound') in which a part of cobalt (Co) is substituted with nickel (Ni) and manganese (Mn) has been developed. Recently, research has been conducted to increase the capacity of NCM-based lithium composite transition metal compound by increasing the content of Ni in the compound. However, a Ni-rich cathode active material with a high nickel content has disadvantages such as increase in resistance and increase in gas generation due to deterioration in thermal stability and increase in side reactions during electrochemical reactions.

Meanwhile, although graphite is usually used as an anode active material for a lithium secondary battery, it is difficult to increase the capacity of the lithium secondary battery because graphite has a small capacity per unit mass of 372 mAh/g. Accordingly, in order to increase the capacity of a lithium secondary battery, anode materials such as silicon, tin and oxides thereof have been developed as non-carbon-based anode materials having higher energy density than graphite. However, although these non-carbon-based anode materials have a large capacity, these materials have a problem in that the amount of lithium consumed is large and the irreversible capacity loss is large during the initial charging and discharging due to the low initial efficiency.

SUMMARY OF THE DISCLOSURE

The inventors have found that in a lithium secondary battery designed in a limited space, optimum battery performance can be implemented by a specific combination of the type, average particle diameter, and/or content of each component of the active material that constitutes the cathode and the anode, thereby leading to the present disclosure.

An embodiment of the present disclosure provides a lithium secondary battery including: a cathode including a cathode active material; an anode including an anode active material; a separator provided between the cathode and the anode; and an electrolyte, in which the cathode active material includes a lithium composite transition metal compound including nickel (Ni), cobalt (Co) and manganese (Mn), the lithium composite transition metal compound includes at least one of single particles or pseudo-single particles, wherein each single particle consists of one nodule, wherein each pseudo-single crystal is a composite of 30 or fewer nodules, the average particle diameter (D50) of the at least one of single particles or pseudo-single particles is 1 μm or more, the anode active material includes a silicon carbon composite, the silicon carbon composite has an average particle diameter (D50) of more than 1 μm and the average particle diameter (D50) of the at least one of single particles or pseudo-single particles is smaller than the average particle diameter (D50) of the silicon carbon composite, and a battery module and a battery pack including the same.

According to the embodiments described in the present specification, the energy density of a lithium secondary battery designed in a limited space can be increased, the high output performance thereof can be improved, and the battery cycle performance can also be improved.

DETAILED DESCRIPTION

Hereinafter, the present invention will be described in more detail in order to help the understanding of the present invention. The present invention can be implemented in various different forms, and is not limited to the exemplary embodiments described herein. In this case, terms or words used in the specification and the claims should not be interpreted as being limited to typical or dictionary meanings and should be interpreted with a meaning and a concept that are consistent with the technical spirit of the present disclosure based on the principle that an inventor can appropriately define a concept of a term in order to describe his/her own invention in the best way.

In the present disclosure, the term "comprise", "include", or "have" is intended to indicate the presence of the characteristic, number, step, constituent element, or any combination thereof implemented, and should be understood to mean that the possibility of the presence or addition of one or more other characteristics or numbers, steps, constituent elements, or any combination thereof is not precluded.

A case where a part such as a layer is present "above" or "on" another part includes not only a case where the part is present "immediately above" another part, but also a case where still another part is present therebetween. Conversely, the case where a part is present "immediately above" another part means that no other part is present therebetween. In addition, a case of being "above" or "on" a reference part means being located above or below the reference part, and does not necessarily mean being located "above" or "on" in the opposite direction of gravity.

In the present disclosure, "single particle" is a particle consisting of a single nodule. A "nodule" according to the present disclosure may be a single crystal lacking any crystalline grain boundary, or alternatively may be a polycrystal in which grain boundaries do not appear when observed in a field of view of 5000× to 20000× using a scanning electron microscope (SEM). In the present disclosure, a "pseudo-single particle" refers to a particle which is a composite formed of 30 or less nodules. In the present disclosure, a "secondary particle" refers to a particle formed by agglomeration of a plurality several tens to several hundreds of primary particles. More specifically, a secondary particle is an agglomerate of 50 primary particles or more.

In the present disclosure, when a "particle" is described, any one or all of a single particle, a pseudo-single particle, a primary particle, a nodule, and a secondary particle may be encompassed.

In the present specification, "average particle diameter (D50)" may be defined as a particle diameter corresponding to 50% of the volume cumulative amount in a particle diameter distribution curve of the particles. The average particle diameter (D50) may be measured using, for example, a laser diffraction method. The laser diffraction method can generally measure a particle diameter of about several mm from the submicron region, and results with high reproducibility and high resolution may be obtained.

The measurement of the average particle diameter (D50) may be confirmed using water and Triton-X100 dispersant using a Microtrac apparatus (manufacturer: Microtrac model name: S3500). Specifically, the average particle diameter (D50) of the cathode active material may be measured in a range of a refractive index of 1.5 to 1.7, and the anode active material may be measured under the condition of a refractive index of 1.97 or 2.42. For example, after particles are dispersed in a dispersion medium, the resulting dispersion is introduced into a commercially available laser diffraction particle size measuring device to irradiate the dispersion with an ultrasonic wave of about 28 kHz with an output of 60 W, then a volume cumulative particle size distribution graph is obtained, and then the average particle diameter may be measured by obtaining the particle size corresponding to 50% of the volume cumulative amount.

An embodiment of the present disclosure provides a lithium secondary battery including: a cathode including a cathode active material; an anode including an anode active material; a separator provided between the cathode and the anode; and an electrolyte, in which the cathode active material includes a lithium composite transition metal compound including nickel (Ni), cobalt (Co) and manganese (Mn), the lithium composite transition metal compound includes single particles and/or pseudo-single particles having an average particle diameter (D50) of 1 μm or more, each single particle consists of one nodule, each pseudo-single particle is a composite of 30 or fewer nodules, the anode active material includes a silicon carbon composite, the silicon carbon composite has an average particle diameter (D50) of more than 1 μm, and the average particle diameter (D50) of the single particles or pseudo-single particles is smaller than the average particle diameter (D50) of the silicon carbon composite.

The silicon carbon composite may be a Si/C-based active material.

In the present specification, the silicon carbon composite is a composite of Si and C, and is distinguished from silicon carbide which is represented as SiC. Since the silicon carbide does not react with lithium electrochemically, all performance such as service life characteristics may be measured as zero.

The silicon carbon composite may be a composite of silicon, graphite, and the like, and may also form a structure in which a core of silicon and graphite composite and the like is surrounded by graphene, amorphous carbon or the like. In the silicon carbon composite, the silicon may be nano-silicon. For example, the nano-silicon may be silicon in the range of 1 nm to 999 nm.

A lithium secondary battery has a size required by its use, and needs to be designed within a limited space. Although consumer demand for increase in energy density and improvement in high output performance is increasing, there is no choice but to increase the content of anode materials to match the demand when a high-capacity cathode material is used, so that there is a limit to increasing the battery efficiency in a limited space. In addition, depending on the type of anode material, it is necessary to design a cathode material having an efficiency that matches the efficiency of the anode material.

For example, the energy density may be improved, but when the electrode density is increased by decreasing the porosity of the cathode, a strong rolling for this purpose may cause deterioration in battery performance due to cracks generated on particles.

The single particles used in embodiments of the present disclosure have high rigidity of the particles themselves, and thus are relatively excellent in deterioration of battery performance even when the electrode density is high. Therefore, it is possible to increase the energy density by combining the single particles and the silicon carbon composite according to the average particle diameter range.

According to additional embodiments of the present disclosure, it is characterized in that the cathode active material includes a lithium composite transition metal compound including nickel (Ni), cobalt (Co) and manganese (Mn), the lithium composite transition metal compound includes single particles and/or pseudo-single particles, and the average particle diameter (D50) of the single particles and/or pseudo-single particles is 1 μm or more.

As the average particle diameter (D50) of the single particles and/or pseudo-single particles becomes smaller, the specific surface area increases and side reactions with the electrolyte increase, which can lead to a decrease in electrochemical performance such as service life performance. If the average particle diameter (D50) of the single particles and/or pseudo-single particles is less than 1 μm, this may not be a commercially applicable range, and even if it is, the service life performance may be very low due to the increased specific surface area, making it difficult to apply.

When the average particle diameter (D50) of the single particles and/or pseudo-single particles is 1 μm or more, 3 μm or more, or 5 μm or more, the single particles and/or pseudo-single particles have excellent service life performance due to reduced side reactions with the electrolyte.

Simultaneously, it is characterized in that the anode active material includes a silicon carbon composite, the silicon carbon composite has an average particle diameter (D50) of more than 1 μm, and the average particle diameter (D50) of the single particles and/or pseudo-single particles is smaller than the average particle diameter (D50) of the silicon carbon composite.

As the average particle diameter (D50) of the silicon carbon composite becomes smaller, the specific surface area increases and side reactions with the electrolyte increase, which can lead to a decrease in electrochemical performance such as service life performance. If the average particle diameter (D50) of the silicon carbon composite is less than 1 μm, the specific surface area increases and side reactions increase, resulting in very low As the average particle diameter (D50) of the silicon carbon composite becomes smaller, the specific surface area increases and side reactions with the electrolyte increase, which can lead to a decrease in electrochemical performance such as service life performance, which may be difficult to apply.

When the average particle diameter (D50) of the silicon carbon composite is more than 1 μm, more than 3 μm, or more than 5 μm, side reactions with the electrolyte are reduced, resulting in excellent life performance.

The silicon carbon composite has excellent service life performance in the above range, and the Si crystal grain size of the silicon carbon composite may be 10 nm or less. Furthermore, the silicon carbon composite has excellent initial capacity and efficiency compared to other silicon systems, such as SiO, and excellent electrochemical performance, so that optimal battery performance can be realized at the average of the single particles and/or pseudo-single particles combination.

Even though the single particles and/or pseudo-single particles are formed of small particle diameters, the single particles and/or pseudo-single particles may have excellent particle strength, and the excellent particle strength may alleviate a phenomenon in which the number of particulates in the electrode due to cracking of the particles is increased, thereby improving the service life characteristics of the battery.

When the average particle diameter (D50) of the single particles and/or pseudo-single particles is smaller than the average particle diameter (D50) of the silicon carbon composite, the diffusion resistance of the single particles and/or pseudo-single particles may be relatively decreased to improve the service life performance. That is, lithium enters the single particles and/or pseudo-single particles on a discharge basis, and the diffusion resistance can increase as the average particle diameter (D50) of the single particles and/or pseudo-single particles increases. If the average particle diameter (D50) of the single particles and/or pseudo-single particles is larger than the average particle diameter (D50) of the silicon carbon composite, lithium may not be able to enter into the single particles and/or pseudo-single particles due to the relative increase in diffusion resistance, and may precipitate, resulting in a decrease in battery performance and a decrease in service life performance.

When the average particle diameter (D50) of the single particles and/or pseudo-single particles is smaller than the average particle diameter (D50) of the silicon carbon composite, it is possible to prevent the occurrence of side reactions with the electrolytic solution due to an increase in the specific surface area, thereby improving the service life performance.

If the average particle diameter (D50) of the single particles and/or pseudo-single particles is smaller than the average particle diameter (D50) of the silicon carbon composite, the diffusion resistance of the single particles and/or pseudo-single particles may be relatively reduced, thereby improving the service life performance.

Since the average particle diameter (D50) of the single particles and/or pseudo-single particles have a larger lithium diffusion resistance than the silicon carbon composite, if the average particle diameter (D50) of the single particles and/or pseudo-single particles is larger than the average particle diameter (D50) of the silicon composite, charging/discharging may not be performed well due to the increased lithium diffusion resistance, resulting in poor service life performance. Accordingly, the average particle diameter (D50) of the single particles and/or pseudo-single particles may be smaller than the average particle diameter (D50) of the silicon carbon composite.

According to additional exemplary embodiments of the present disclosure, the cathode active material includes the nickel, cobalt and manganese, and may further include aluminum.

According to embodiments of the present disclosure, the lithium composite transition metal compound includes 80 mol % or more of nickel among the metals except for lithium.

In another embodiment, the cathode active material includes 80 mol % or more and less than 100 mol % of nickel among the metals except for lithium, and a lithium composite transition metal compound including 80 mol % or more and less than 100 mol % of nickel among the metals except for lithium may include one or a mixture of two or more represented by the following Chemical Formula 1.

The lithium composite transition metal compound may further include secondary particles in addition to single particles and/or pseudo-single particles.

$$Li_aNi_{1-b-c-d}Co_bMn_cQ_dO_{2+\delta}$$ [Chemical Formula 1]

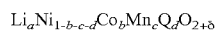

In the chemical formula, Q is any one or more elements selected from the group consisting of Na, K, Mg, Ca, Sr, Ni, Co, Ti, Al, Si, Sn, Mn, Cr, Fe, V and Zr, $1 \leq a \leq 1.5$, $0 < b \leq 0.5$, $0 < c \leq 0.5$, $0 \leq d \leq 0.1$, $0 < b+c+d \leq 20$, and $-0.1 \leq \delta \leq 1.0$.

In the lithium composite transition metal compound of Chemical Formula 1, Li may be included in the content corresponding to a, that is, $1 \leq a \leq 1.5$. There is a concern in that when a is less than 1, the capacity may be reduced, and when a exceeds 1.5, the particles may be sintered in the firing process, making it difficult to prepare a cathode active material. Considering the effect of improving the capacity characteristics of the cathode active material by controlling the content of Li and the balance of sinterability during the preparation of the active material, Li may be included more preferably in a content of $1.1 \leq a \leq 1.2$.

In the lithium composite transition metal compound of Chemical Formula 1, Ni may be included in a content corresponding to $1-(b+c+d)$, for example, $0.8 \leq 1-(b+c+d) < 1$. When the content of Ni in the lithium composite transition metal compound of Chemical Formula 1 becomes a composition of 0.8 or more, a sufficient amount of Ni to contribute to charge/discharge may be secured to achieve a high capacity. Preferably, $1-(b+c+d)$ that is the content of Ni may be 0.88, preferably 0.9 or more, and more preferably 0.93 or more. Preferably, $1-(b+c+d)$ that is the content of Ni may be 0.99 or less, or 0.95 or less.

In the lithium composite transition metal compound of Chemical Formula 1, Co may be included in a content corresponding to b, that is, $0 < b \leq 0.5$. When the content of Co in the lithium composite transition metal compound of Chemical Formula 1 exceeds 0.5, there is a concern in that the cost is increased. Considering the remarkable effect of improving capacity characteristics including Co, Co may be more specifically included in a content of $0.03 \leq b \leq 0.2$.

In the lithium composite transition metal compound of Chemical Formula 1, Mn may be included in a content corresponding to c, that is, a content of $0<c \leq 0.5$. There is a concern in that when c in the lithium composite transition metal compound of Chemical Formula 1 exceeds 0.5, the output characteristics and capacity characteristics of the battery may rather deteriorate, and the Mn may be included more specifically in a content of $0.01 \leq c \leq 0.2$.

In the lithium composite transition metal compound of Chemical Formula 1, Q may be a doping element included in the crystal structure of the lithium complex transition metal compound, and Q may be included in a content corresponding to d, that is, $0 \leq d \leq 0.1$. Q may be one or two or more selected among Na, K, Mg, Ca, Sr, Ni, Co, Ti, Al, Si, Sn, Mn, Cr, Fe, V and Zr, and for example, Q may be Al.

According to additional exemplary embodiments of the present disclosure, the lithium composite transition metal compound in the cathode active material may include single particles and/or pseudo-single particles, and secondary particles.

The single particles and/or pseudo-single particles may be prepared by mixing a transition metal precursor and a lithium raw material and firing the resulting mixture. The secondary particles may be prepared by a different method than the single particles and/or pseudo-single particles, and the composition thereof may be the same as or different from that of the single particles and/or pseudo-single particles.

For example, the firing is performed at a temperature capable of forming single particles and/or pseudo-single particles. In order to form the single particles and/or pseudo-single particles, the firing needs to be performed at a temperature higher than that in the preparation of the secondary particles, and for example, when the composition of the precursor is the same, the firing needs to be performed at a temperature about 30° C. to 100° C. higher than that when the secondary particles are prepared. The firing temperature for forming the single particles and/or pseudo-single particles may vary depending on the metal composition in the precursor, and for example, when a high-Ni NCM-based lithium composite transition metal oxide having a nickel (Ni) content of 80 mol % or more is desired to be formed as single particles and/or pseudo-single particles, the firing temperature may be 700° C. to 1000° C., preferably approximately 800° C. to 950° C. When the firing temperature satisfies the above range, a cathode active material including single particles and/or pseudo-single particles with excellent electrochemical properties may be prepared. When the firing temperature is less than 790° C., a cathode active material including a lithium composite transition metal compound in the form of secondary particles may be prepared, and when the firing temperature exceeds 950° C., the firing may occur excessively, so a layered crystal structure may not be properly formed, thereby degrading the electrochemical properties.

In the present disclosure, the single particles and/or the pseudo-single particles are terms used to distinguish from secondary particles formed by aggregation of tens to hundreds of primary particles in the related art.

Specifically, in the present disclosure, the single particle consists of one nodule and the pseudo-single particle is an aggregate of 30 or less nodules. In contrast, secondary particles may be in the form of aggregates of several hundred primary particles.

According to additional exemplary embodiments of the present disclosure, the average particle diameter (D50) of the single particles and/or pseudo-single particles is 1 μm or more, and the silicon carbon composite has an average particle diameter (D50) of more than 1 μm.

According to an exemplary embodiment, the average particle diameter (D50) of the single particles and/or pseudo-single particles may be 1 μm or more, and the silicon carbon composite may have an average particle diameter (D50) of more than 1 μm.

According to additional embodiments of the present disclosure, the average particle diameter (D50) of the single particles and/or pseudo-single particles is 12 μm or less, and the silicon carbon composite has an average particle diameter (D50) of less than 15 μm.

For example, the single particles and/or pseudo-single particles may have an average particle diameter (D50) of 1 μm or more and 12 μm or less, 1 μm or more and 8 μm or less, 1 μm or more and 5 μm or less, more than 1 μm and 12 μm or less, more than 1 μm and 8 μm or less, or more than 1 μm and 5 μm or less.

Even though the single particles and/or pseudo-single particles are formed as small particle diameters having an average particle diameter (D50) of 1 μm or more and 12 μm or less, the particle strength may be excellent. For example, the single particles and/or pseudo-single particles may have a particle strength of 100 to 300 MPa when rolled with a force of 650 kgf/cm². As a result, even though the single particles and/or pseudo-single particles are rolled with a strong force of 650 kgf/cm², a phenomenon in which the number of particulates in the electrode due to cracking of the particles is increased is alleviated, thereby improving the service life characteristics of the battery.

When the average particle diameter (D50) of the single particles and/or pseudo-single particles satisfies the above range, the single particles and/or pseudo-single particles has excellent service life performance due to reduced side reactions with the electrolyte, and excellent electrochemical performance due to good charge/discharge.

If the average particle diameter (D50) of the single particles and/or pseudo-single particles is less than 1 μm, the service life performance may be very low due to the increase in specific surface area, making it difficult to apply.

If the average particle diameter (D50) of the single particles and/or pseudo-single particles is 12 μm or less, excellent electrochemical performance due to good charge/discharge.

The method of forming the single particles and/or pseudo-single particles is not particularly limited, but in general, single particles and/or pseudo-single particles may be formed by increasing the firing temperature to achieve overfiring, and single particles and/or pseudo-single particles may be prepared by a method of using an additive such as a grain growth promoter that helps overfiring or changing a starting material, and the like.

According to additional embodiments of the present disclosure, the silicon carbon composite may have an average particle diameter (D50) of more than 1 μm and less than 15 μm, 2 μm or more and 14 μm or less, or 3 μm or more and 13 μm or less.

Even though the silicon carbon composite is formed with a small particle diameter having an average particle diameter (D50) of more than 1 μm and less than 15 μm, the service life characteristics of the battery may be improved. For example, when the average particle diameter (D50) of the silicon carbon composite is more than 1 μm and less than 15 μm, volume expansion and contraction rate according to charging and discharging may be reduced to improve the service life performance. In addition, the specific surface area is prevented from excessively increasing to prevent side reactions with the electrolytic solution due to progress of the cycle, so that the service life performance may be improved.

If the average particle diameter (D50) of the silicon carbon composite is 1 µm or less, the service life performance may be very low due to the increase in specific surface area, making it difficult to apply.

If the average particle diameter (D50) of the silicon carbon composite is less than 15 µm, the particles are small and charge and discharge can be easily accomplished, and the rate of volume expansion and contraction of the particles due to charge and discharge can be reduced, thereby improving the service life performance.

According to additional embodiments of the present disclosure, the average particle diameter (D50) of the single particles and/or pseudo-single particles is characterized by being smaller than the average particle diameter (D50) of the silicon carbon composite. Whereby, even though the single particles and/or pseudo-single particles are formed of small particle diameters, the single particles and/or pseudo-single particles may have excellent particle strength, and the excellent particle strength may alleviate a phenomenon in which the number of particulates in the electrode due to cracking of the particles is increased, thereby improving the service life characteristics of the battery.

If the average particle diameter (D50) of the single particles and/or pseudo-single particles is smaller than the average particle diameter (D50) of the silicon carbon composite, the diffusion resistance of the single particles and/or pseudo-single particles having a larger lithium diffusion resistance than the silicon carbon composite may be relatively reduced, resulting in improved service life performance.

According to an embodiment of the present disclosure, the average particle diameter (D50) of the single particles and/or pseudo-single particles is 1 µm to 12 µm smaller than the average particle diameter (D50) of the silicon carbon composite.

The average particle diameter (D50) of the single particles and/or pseudo-single particles may be 1.5 µm to 11.5 µm, or 2 µm to 11 µm smaller than the average particle diameter (D50) of the silicon carbon composite.

The average particle diameter (D50) of the single particles and/or pseudo-single particles may be 2 µm or more, or 4 µm or more, smaller than the average particle diameter (D50) of the silicon carbon composite. The average particle diameter (D50) of the single particles and/or pseudo-single particles may be 11 µm or less, 8 µm or less, or 6 µm or less, smaller than the average particle diameter (D50) of the silicon carbon composite.

When the average particle diameter (D50) of the single particles and/or pseudo-single particles is smaller than the average particle diameter (D50) of the silicon carbon composite, for example, when the above range is satisfied, the diffusion resistance of the single particles may be relatively decreased to improve the service life performance. That is, as the larger the average particle diameter (D50) of the single particles and/or pseudo-single particles is increased, the diffusion resistance may be increased, and when the average particle diameter (D50) of the single particles and/or pseudo-single particles is larger than the average particle diameter (D50) of the silicon carbon composite, due to the relative increase in the diffusion resistance, lithium precipitation and the like may occur, resulting in deterioration of battery performance and deterioration in service life performance.

When the average particle diameter (D50) of the single particles and/or pseudo-single particles is smaller than the average particle diameter (D50) of the silicon carbon composite, for example, when the above range is satisfied, it is possible to prevent the occurrence of side reactions with the electrolytic solution due to an increase in the specific surface area, thereby improving the service life performance.

According to an embodiment of the present disclosure, the ratio of the average particle diameter (D50) of the single particles and/or pseudo-single particles to the average particle diameter (D50) of the silicon carbon composite range from 1.5:2 to 1.5:20.

In some embodiments, the ratio of the average particle diameter (D50) of the single particles and/or pseudo-single particles to the average particle diameter (D50) of the silicon carbon composite may be 1.5:2 to 1.5:19 or 1.5:2 to 1.5:18.

In some embodiments, the ratio of the average particle diameter (D50) of the single particles and/or pseudo-single particles to the average particle diameter (D50) of the silicon carbon composite may be 1.5:2 or more, 1.5:2.5 or more, 1.5:3.5 or more, or 1.5:4.5 or more. In some embodiments, the ratio of the average particle diameter (D50) of the single particles and/or pseudo-single particles to the average particle diameter (D50) of the silicon carbon composite may be 1.5:18 or less, 1.5:16 or less, 1.5:14 or less, 1.5:12 or less, or 1.5:10 or less.

When the above range is satisfied, the diffusion resistance of the single particles and/or pseudo-single particles may be relatively decreased to improve the service life performance. That is, as the larger the average particle diameter (D50) of the single particles and/or pseudo-single particles is increased, the diffusion resistance may be increased, and when the average particle diameter (D50) of the single particles and/or pseudo-single particles is larger than the average particle diameter (D50) of the silicon carbon composite, due to the relative increase in the diffusion resistance, lithium precipitation and the like may occur, resulting in deterioration of battery performance and deterioration in service life performance.

When the average particle diameter (D50) of the single particles and/or pseudo-single particles is smaller than the average particle diameter (D50) of the silicon carbon composite, for example, when the above range is satisfied, it is possible to prevent the occurrence of side reactions with the electrolytic solution due to an increase in the specific surface area, thereby improving the service life performance.

In an exemplary embodiment of the present disclosure, the lithium composite transition metal compound further includes secondary particles, and the average particle diameter (D50) of the single particles and/or pseudo-single particles is smaller than the average particle diameter (D50) of the secondary particles.

In the present disclosure, the single particle consists of one nodule and the pseudo-single particle is an aggregate of 30 or less nodules, and secondary particles may be in the form of aggregates of several hundred primary particles.

The above-described lithium composite transition metal compound may further include secondary particles. A secondary particle refers to a form formed by aggregation of primary particles, and may be distinguished from the concept of a single particle consisting of one nodule, or a pseudo-single particle which is an aggregate of 30 or less nodules.

The secondary particles may have a particle diameter (D50) of 1 µm to 20 µm, 2 µm to 17 µm, preferably 3 µm to 15 µm. The secondary particles may have a specific surface area (BET) of 0.05 m²/g to 10 m²/g, preferably 0.1 m²/g to 1 m²/g, and more preferably 0.3 m²/g to 0.8 m²/g.

In additional exemplary embodiments of the present disclosure, the secondary particle is an aggregate of primary particles, and the primary particles may have an average particle diameter (D50) of 0.5 μm to 3 μm. Specifically, the secondary particle may be in the form of aggregation of several hundred primary particles, and the primary particles may have an average particle diameter (D50) of 0.6 μm to 2.8 μm, 0.8 μm to 2.5 μm, or 0.8 μm to 1.5 μm.

When the average particle diameter (D50) of the primary particles agglomerated in the secondary particles satisfies the above range, a single particle cathode active material with excellent electrochemical properties may be formed. When the average particle diameter (D50) of the primary particles agglomerated in the secondary particles is too small, the number of aggregated primary particles forming the lithium-nickel-based oxide particles increases, so the effect of suppressing the occurrence of particle cracking during rolling is reduced, and when the average particle diameter (D50) of the primary particles agglomerated in the secondary particles is too large, the lithium diffusion path inside the primary particles becomes long, so the resistance increases and the output characteristics may deteriorate.

According to additional embodiments of the present disclosure, the average particle diameter (D50) of the single particles and/or pseudo-single particles is characterized by being smaller than the average particle diameter (D50) of the secondary particles. Whereby, even though the single particles and/or pseudo-single particles are formed of small particle diameters, the single particles may have excellent particle strength, and the excellent particle strength may alleviate a phenomenon in which the number of particulates in the electrode due to cracking of the particles is increased, thereby improving the service life characteristics of the battery.

In an embodiment of the present disclosure, the average particle diameter (D50) of the single particles and/or pseudo-single particles is 1 μm to 18 μm smaller than the average particle diameter (D50) of the secondary particles.

For example, the average particle diameter (D50) of the single particles and/or pseudo-single particles may be 1 μm to 16 μm smaller, 1.5 μm to 15 μm smaller, or 2 μm to 14 μm smaller than the average particle diameter (D50) of the secondary particles.

The average particle diameter (D50) of the single particles and/or pseudo-single particles may be 1 μm or more, 2 μm or more, 4 μm or more, or 6 μm or more smaller than the average particle diameter (D50) of the secondary particles. The average particle diameter (D50) of the single particles and/or pseudo-single particles may be 18 μm or less, 16 μm or less, 14 μm or less, 12 μm or less, 10 μm or less, or 8 μm or less smaller than the average particle diameter (D50) of the secondary particles. When the average particle diameter (D50) of the single particles and/or pseudo-single particles is smaller than the average particle diameter (D50) of the secondary particles, for example, when the above range is satisfied, the single particles and/or pseudo-single particles may have excellent particle strength even though formed with a small particle diameter, and the excellent particle strength alleviates a phenomenon in which the number of particulates in the electrode due to cracking of the particles is increased, so there is an effect of improving the service life characteristics of the battery and improving the energy density.

In the lithium secondary battery according to the above-described exemplary embodiments, the anode active material may further include a carbon-based active material. Specifically, the carbon-based active material may be graphite. The graphite may be natural graphite, artificial graphite or a mixture thereof.

In an embodiment of the present disclosure, the anode active material further includes graphite, and the average particle diameter (D50) of the silicon carbon composite is smaller than the average particle diameter (D50) of the graphite.

When the average particle diameter (D50) of the silicon carbon composite is smaller than the average particle diameter (D50) of the graphite, particle cracking is reduced due to the decrease in volume expansion/contraction rate during charging and discharging, so there is an effect of improving the service life performance of the battery. According to an embodiment of the present disclosure, the average particle diameter (D50) of the silicon carbon composite is 1 μm to 25 μm smaller than the average particle diameter (D50) of the graphite.

For example, the average particle diameter (D50) of the silicon carbon composite may be 2 μm to 24 μm smaller, 3 μm to 23 μm smaller, or 4 μm to 22 μm smaller than the average particle diameter (D50) of the graphite.

The average particle diameter (D50) of the silicon carbon composite may be 1 μm or more, 2 μm or more, 3 μm or more, 4 μm or more, 5 μm or more, 6 μm or more, 7 μm or more, 8 μm or more, 9 μm or more, or 10 μm or more smaller than the average particle diameter (D50) of the graphite. The average particle diameter (D50) of the silicon carbon composite may be 25 μm or less, 23 μm or less, 22 μm or less, 20 μm or less, 18 μm or less, 16 μm or less, or 14 μm or smaller than the average particle diameter (D50) of the graphite.

When the average particle diameter (D50) of the silicon carbon composite is smaller than the average particle diameter (D50) of the graphite, for example, when the above range is satisfied, there is an effect of improving the service life performance of the battery.

In an embodiment of the present disclosure, the lithium composite transition metal compound further includes secondary particles, the anode active material further includes graphite, and the average particle diameters (D50) of the secondary particles, the single particles and/or pseudo-single particles, the graphite and the silicon carbon composite are represented by A, B, C and D, respectively, where $B<D\leq A<C$.

The exemplary embodiments of the secondary particles, the single particles and/or pseudo-single particles, the graphite, and the silicon carbon composite are as described above.

When the average particle diameters (D50) of the secondary particles, the single particles and/or pseudo-single particles, the graphite, and the silicon carbon composite are A, B, C, and D, respectively, the case where $B<D\leq A<C$ has an effect of improving the service life performance of the battery.

According to an embodiment of the present disclosure, the anode active material further includes graphite, and the average particle diameters (D50) of the single particles and/or pseudo-single particles, the graphite and the silicon carbon composite are represented by B, C and D, respectively, where $B<D<C$.

The average particle diameters (D50) of the secondary particles, the single particles and/or pseudo-single particles and the silicon carbon composite are represented by A, B and D, respectively, and may be $B<D\leq A$.

The average particle diameters (D50) of the secondary particles, the single particles and/or pseudo-single particles and the graphite are represented by A, B and C, respectively, and may be B<A<C.

The average particle diameters (D50) of the secondary particles, the graphite and the silicon carbon composite are represented by A, C and D, respectively, and may be D≤A<C.

When the above ranges are satisfied, there is an effect of improving the service life performance of the battery.

In an embodiment of the present disclosure, in the lithium secondary battery according to the above-described exemplary embodiments, the single particles and/or pseudo-single particles are included in an amount of 15 parts by weight to 100 parts by weight based on 100 parts by weight of the cathode active material, and the silicon carbon composite is included in an amount of 3 parts by weight to 30 parts by weight based on 100 parts by weight of the anode active material.

According to additional exemplary embodiments of the present disclosure, the single particles and/or pseudo-single particles are included in an amount of 15 parts by weight to 100 parts by weight based on 100 parts by weight of the cathode active material. The single particles and/or pseudo-single particles may be included in an amount of 20 parts by weight to 100 parts by weight, 30 parts by weight to 100 parts by weight, 40 parts by weight to 100 parts by weight, or 50 parts by weight to 100 parts by weight based on 100 parts by weight of the cathode active material.

For example, single particles and/or pseudo-single particles may be included in an amount of 15 parts by weight or more, 20 parts by weight or more, 25 parts by weight or more, 30 parts by weight or more, 35 parts by weight or more, 40 parts by weight or more, 45 parts by weight or more, or 50 parts by weight or more based on 100 parts by weight of the cathode active material. The single particles and/or pseudo-single particles may be included in an amount of 100 parts by weight or less based on 100 parts by weight of the cathode active material.

When the single particles and/or pseudo-single particles within the above range are included, excellent battery characteristics may be exhibited in combination with the above-described anode material. In particular, when the amount of the single particles and/or pseudo-single particles is 15 parts by weight or more, a phenomenon in which the number of particulates in the electrode due to particle cracking during the rolling process after manufacturing the electrode is increased may be alleviated, thereby improving the service life characteristics of the battery.

In an exemplary embodiment of the present disclosure, the lithium composite transition metal compound may further include secondary particles, wherein the secondary particles may include 0 parts by weight to 85 parts by weight, 0 parts by weight to 70 parts by weight, or 0 parts by weight to 50 parts by weight based on 100 parts by weight of the cathode active material.

The amount of the secondary particles may be 85 parts by weight or less, 80 parts by weight or less, 75 parts by weight or less, 70 parts by weight or less, 65 parts by weight or less, 60 parts by weight or less, 55 parts by weight or less, or 50 parts by weight or less based on 100 parts by weight of the cathode active material. The amount of the secondary particles may be 0 parts by weight or more, or 20 parts by weight or more based on 100 parts by weight of the cathode active material.

When the above range is satisfied, the above-described effect due to the presence of the cathode active material of single particles and/or pseudo-single particles may be maximized. When the cathode active material of secondary particles is included, the components may be the same as those exemplified as the above-described single particle cathode active material, may be other components, and may mean a form of aggregation of single particle forms.

In an embodiment of the present disclosure, the cathode further includes a cathode active material layer including the cathode active material, and the cathode active material in 100 parts by weight of the cathode active material layer may be included in an amount of 80 parts by weight or more and 99.9 parts by weight or less, preferably 90 parts by weight or more and 99.9 parts by weight or less, more preferably 95 parts by weight or more and 99.9 parts by weight or less, and even more preferably 98 parts by weight or more and 99.9 parts by weight or less.

According to an embodiment of the present disclosure, the cathode according to the above-described exemplary embodiments further includes a cathode binder and a conductive material.

The cathode binder serves to improve the bonding between cathode active material particles and the adhesion between the cathode active material particles and the cathode current collector. As the cathode binder, those known in the art may be used, non-limiting examples thereof include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The cathode binder may be included in an amount of 0.1 parts by weight or more and 50 parts by weight or less, for example, preferably 0.3 parts by weight or more and 35 parts by weight or less, and more preferably 0.5 parts by weight or more and 20 parts by weight or less, based on 100 parts by weight of the cathode active material layer.

The conductive material included in the cathode active material layer is used to impart conductivity to the electrode, and can be used without particular limitation as long as the conductive material has electron conductivity without causing a chemical change in a battery. Specific examples thereof include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as zinc oxide and potassium titanate; a conductive metal oxide such as titanium oxide; or a conductive polymer such as a polyphenylene derivative, and any one thereof or a mixture of two or more thereof may be used.

Specifically, in an exemplary embodiment, the conductive material may include one or more of single-walled carbon nanotube (SWCNT); and multi-walled carbon nanotube (MWCNT). The conductive material may be included in an amount of 0.1 parts by weight or more and 2 parts by weight or less, for example, preferably 0.3 parts by weight or more and 1.5 parts by weight or less, and more preferably 0.5 parts by weight or more and 1.2 parts by weight or less, based on 100 parts by weight of the composition for a cathode active material layer.

In the present specification, the silicon carbon composite is a composite of Si and C, Si and C (graphite) peaks are observed in the XRD diffraction pattern, and it appears that the second phase Si/C is not formed. The silicon carbon composite is distinguished from a silicon carbide insulator represented as SiC.

According to the above-described embodiments of the present disclosure, the anode further includes an anode active material layer including the anode active material, and the anode active material layer includes a silicon carbon composite in an amount of 3 parts by weight to 30 parts by weight based on 100 parts by weight of the entire anode active material. According to an example, the anode active material layer may include a silicon carbon composite in an amount of 3 parts by weight to 20 parts by weight, or 3 parts by weight to 13 parts by weight, preferably 5 parts by weight to 10 parts by weight, based on 100 parts by weight of the entire anode active material.

The anode active material layer may include a silicon carbon composite in an amount of 3 parts by weight or more, 4 parts by weight or more, or 5 parts by weight or more based on 100 parts by weight of the entire anode active material. The anode active material layer may include a silicon carbon composite in an amount of 30 parts by weight or less, 20 parts by weight or less, or 10 parts by weight or less based on 100 parts by weight of the entire anode active material.

By using the silicon carbon composite within the range described above, excellent battery characteristics may be exhibited in combination with the above-described cathode material. In particular, when the silicon carbon composite is included in an amount of 3 parts by weight or more, the effect according to using the silicon carbon composite may be sufficiently exhibited. In addition, since the silicon carbon composite has a higher capacity than the SiOx-based active material, it may be difficult to balance the capacity with the cathode active material when used in an excessive amount, and in particular, when the silicon carbon composite is included in an amount of 30 parts by weight or less, expansion during charging and discharging may be prevented to improve cycle characteristics.

The silicon carbon composite is a material with higher capacity and higher efficiency than silicon-based oxides, and even when a conductive material is not included, it is possible to show an excellent effect in terms of resistance compared to a cathode including silicon-based oxide and a conductive material. In addition, since the silicon carbon composite exhibits higher Si crystallinity than silicon based oxides, it is possible to exhibit an excellent effect during high output evaluation.

According to additional embodiments of the present disclosure, in the lithium secondary battery according to the above-described exemplary embodiments, the anode active material may further include a carbon-based active material. Specifically, the carbon-based active material may be graphite. The graphite may be natural graphite, artificial graphite or a mixture thereof. Based on 100 parts by weight of the entire anode active material included in the anode active material layer, the graphite may be included in an amount of 70 parts by weight or more and 97 parts by weight or less.

Based on 100 parts by weight of the entire anode active material, the graphite may be included in an amount of 75 parts by weight or more, 80 parts by weight or more, or 85 parts by weight or more. Based on 100 parts by weight of the entire anode active material, the graphite may be included in an amount of 95 parts by weight or less, 93 parts by weight or less, or 90 parts by weight or less. When the graphite is a mixture of artificial graphite and natural graphite, the artificial graphite and natural graphite may be included in an amount of 90:10 parts by weight to 50:50 parts by weight, 85:15 parts by weight to 60:40 parts by weight, or 80:20 parts by weight to 65:35 parts by weight based on 100 parts by weight of the graphite.

In an embodiment of the present disclosure, the anode active material in 100 parts by weight of the anode active material layer may be included in an amount of 80 parts by weight or more and 99.9 parts by weight or less, preferably 90 parts by weight or more and 99.9 parts by weight or less, more preferably 95 parts by weight or more and 99.9 parts by weight or less, and even more preferably 98 parts by weight or more and 99.9 parts by weight or less.

According to additional embodiments of the present disclosure, in the lithium secondary battery according to the above-described exemplary embodiments, the anode active material layer may further include an anode binder in addition to a silicon carbon composite and graphite.

The anode binder serves to improve the bonding between anode active material particles and the adhesion between the anode active material particles and the anode current collector. As the anode binder, those known in the art may be used, and non-limiting examples thereof may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene butadiene rubber (SBR), fluorine rubber, polyacrylic acid and a material in which the hydrogen thereof is substituted with Li, Na, Ca, or the like, and may also include various copolymers thereof.

The anode binder may be included in an amount of 0.1 parts by weight or more and 50 parts by weight or less, for example, preferably 0.3 parts by weight or more and 35 parts by weight or less, and more preferably 0.5 parts by weight or more and 10 parts by weight or less, based on 100 parts by weight of the anode active material layer.

The anode active material layer may not include a conductive material, but may further include a conductive material, if necessary. The conductive material included in the anode active material layer is not particularly limited as long as the conductive material has conductivity without causing a chemical change to the battery, and for example, it is possible to use graphite such as natural graphite or artificial graphite; carbon black such as acetylene black, Ketjen black, channel black, furnace black, lamp black, and thermal black; a conductive fiber such as carbon fiber or metal fiber; a conductive tube such as a carbon nanotube; a metal powder such as a carbon fluoride powder, an aluminum powder, and a nickel powder; a conductive whisker such as zinc oxide and potassium titanate; a conductive metal oxide such as titanium oxide; a conductive material such as polyphenylene derivatives, and the like. The content of the conductive material in the anode active material layer may be 0.01 parts by weight to 30 parts by weight, preferably 0.03 parts by weight to 20 parts by weight, based on 100 parts by weight of the anode active material layer.

In an embodiment of the present disclosure, the cathode may include a cathode current collector and a cathode active material layer formed on the cathode current collector and including the cathode active material.

The cathode current collector is not particularly limited as long as the collector has conductivity without causing a chemical change to a battery, and for example, it is possible to use stainless steel, aluminum, nickel, titanium, calcined carbon, or aluminum or stainless steel whose surface is treated with carbon, nickel, titanium, silver, and the like. Further, the cathode current collector may typically have a thickness of 1 to 500 μm, and the adhesion of the cathode active material may also be enhanced by forming fine irregularities on the surface of the current collector. For example, the cathode current collector may be used in various forms such as a film, a sheet, a foil, a net, a porous body, a foam body, and a non-woven fabric body.

In an embodiment of the present disclosure, the anode includes an anode current collector and an anode active material layer formed on the anode current collector and including the anode active material.

The anode current collector is sufficient as long as the anode current collector has conductivity without causing a chemical change to the battery, and is not particularly limited. For example, as the current collector, it is possible to use copper, stainless steel, aluminum, nickel, titanium, fired carbon, or a material in which aluminum or stainless steel whose surface is treated with carbon, nickel, titanium, silver, and the like. Specifically, a transition metal, such as copper or nickel which adsorbs carbon well, may be used as a current collector. Although the current collector may have a thickness of 1 μm to 500 μm, the thickness of the current collector is not limited thereto.

In an embodiment of the present disclosure, the cathode further includes a cathode active material layer including the cathode active material, the anode further includes an anode active material layer including the anode active material, and the thicknesses of the cathode and anode active material layers are each 10 μm or more and 500 μm or less. The thickness of the cathode active material layer may be 90% to 110%, for example, 95% to 105% of the thickness of the anode active material layer, and the thicknesses of the active material layers may be the same. Specifically, the cathode and anode active material layers may each have a thickness of 15 μm or more and 400 μm or less, 20 μm or more and 300 μm or less, 25 μm or more and 200 μm or less, or 30 μm or more and 100 μm or less.

In an embodiment of the present disclosure, the cathode further includes a cathode active material layer including the cathode active material, a loading amount per unit volume of the cathode active material layer is 250 mg/25 cm$^2$ to 900 mg/25 cm$^2$, the anode further includes an anode active material layer including the anode active material, and a loading amount per unit volume of the anode active material layer is 100 mg/25 cm$^2$ to 600 mg/25 cm$^2$. Specifically, a loading amount per unit volume of the cathode active material layer may be 270 mg/25 cm$^2$ to 800 mg/25 cm$^2$, 285 mg/25 cm$^2$ to 700 mg/25 cm$^2$, or 300 mg/25 cm$^2$ to 600 mg/25 cm$^2$, and a loading amount per unit volume of the anode active material layer may be 120 mg/25 cm$^2$ to 500 mg/25 cm$^2$, 135 mg/25 cm$^2$ to 400 mg/25 cm$^2$, or 150 mg/25 cm$^2$ to 300 mg/25 cm$^2$.

The cathode and the anode may be manufactured by a method for manufacturing a cathode and an anode in the related art, except that the aforementioned cathode and anode active materials are used. Specifically, after a composition for forming an active material layer, which includes the aforementioned active material and, optionally, a binder and a conductive material is applied onto current collectors, the cathode and anode may be manufactured by drying and rolling the current collectors. In this case, the types and contents of the positive and negative active materials, binders, and conductive materials are as described above. The solvent may be a solvent commonly used in the art, examples thereof include dimethyl sulfoxide (DMSO), isopropyl alcohol, N-methylpyrrolidone (NMP), acetone, water, or the like, and among them, any one thereof or a mixture of two or more thereof may be used. The amount of solvent used is sufficient as long as the solvent in the amount dissolves or disperses the active material, conductive material and binder in consideration of the disclosure thickness and preparation yield of the slurry, and has a viscosity capable of exhibiting excellent thickness uniformity during subsequent application for manufacturing the cathode and the anode. Alternatively, by another method, the cathode and the anode may be manufactured by casting the composition for forming an active material layer on a separate support and then laminating a film obtained by performing peel-off from the support on a current collector.

The separator separates the anode and the cathode and provides a passage for movement of lithium ions, and can be used without particular limitation as long as the separator is typically used as a separator in a secondary battery, and in particular, a separator having an excellent ability to retain moisture of an electrolytic solution as well as low resistance to ion movement in the electrolyte is preferable. Specifically, it is possible to use a porous polymer film, for example, a porous polymer film formed of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more layers thereof. In addition, a typical porous non-woven fabric, for example, a non-woven fabric made of a glass fiber having a high melting point, a polyethylene terephthalate fiber, and the like may also be used. Furthermore, a coated separator including a ceramic component or a polymeric material may be used to secure heat resistance or mechanical strength and may be selectively used as a single-layered or multi-layered structure.

Examples of the electrolyte include an organic liquid electrolyte, an inorganic liquid electrolyte, a solid polymer electrolyte, a gel-type polymer electrolyte, a solid inorganic electrolyte, a molten-type inorganic electrolyte, and the like, which can be used in the preparation of a lithium secondary battery, but are not limited thereto.

Specifically, the electrolyte may include a non-aqueous organic solvent and a metal salt.

As the non-aqueous organic solvent, it is possible to use, for example, an aprotic organic solvent, such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, among the carbonate-based organic solvents, cyclic carbonates ethylene carbonate and propylene carbonate may be preferably used because the cyclic carbonates have high permittivity as organic solvents of a high viscosity and thus dissociate a lithium salt well, and such a cyclic carbonate may be more preferably used since the cyclic carbonate may be mixed with a linear carbonate of a low viscosity and low permittivity such as dimethyl carbonate and diethyl carbonate in an appropriate ratio and used to prepare an electrolyte having a high electric conductivity.

As the metal salt, a lithium salt may be used, the lithium salt is a material which is easily dissolved in the non-aqueous electrolyte, and for example, as an anion of the lithium salt, it is possible to use one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In the electrolyte, for the purpose of improving the service life characteristics of a battery, suppressing the decrease in battery capacity, and improving the discharge capacity of the battery, one or more additives, such as, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be further included in addition to the above electrolyte constituent components.

The lithium secondary battery according to an exemplary embodiment of the present disclosure has an energy density of 400 Wh/L to 900 Wh/L. Specifically, the lithium secondary battery may have an energy density of 425 Wh/L to 875 Wh/L, 450 Wh/L to 850 Wh/L, 475 Wh/L to 825 Wh/L, or 500 Wh/L to 800 Wh/L. When the above range is satisfied, the energy density of a lithium secondary battery designed in a limited space can be increased, the high output performance thereof can be improved, and the battery cycle performance can also be improved.

A lithium secondary battery according to an exemplary embodiment of the present disclosure may be a cylindrical battery. The cylindrical battery means that the form of the battery itself, which includes an assembly including a cathode, an anode, a separator and an electrolyte, is cylindrical, and specifically, may be composed of a cylindrical can, a battery assembly provided inside the cylindrical can, and a top cap. However, the lithium secondary battery is not limited thereto, and may be a prismatic battery or a pouch-type battery.

Additional exemplary embodiments of the present disclosure provide a battery module including the above-described cylindrical battery as a unit cell and a battery pack including the same. The battery module and the battery pack include the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

Since the lithium secondary battery according to exemplary embodiments of the present disclosure stably exhibits excellent discharge capacity, output characteristics, and cycle performance, the lithium secondary battery may be used as a power source for portable devices such as mobile phones, notebook-sized computers and digital cameras, and medium-and-large sized devices selected from the group consisting of electric vehicles, hybrid electric vehicles, plug-in hybrid electric vehicles, and power storage systems. For example, the battery module or battery pack may be used as a power source for a power tool; an electric vehicle including an electric vehicle (EV), a hybrid electric vehicle and a plug-in hybrid electric vehicle (PHEV); and one or more medium-and-large sized devices of a power storage system.

Hereinafter, preferred embodiments will be suggested to facilitate understanding of the present invention, but the embodiments are only provided to illustrate the present invention, and it is apparent to those skilled in the art that various alterations and modifications are possible within the scope and technical spirit of the present disclosure, and it is natural that such alterations and modifications also fall within the accompanying claims.

Example 1

A composition for forming a cathode active material, including 98.04 parts by weight (single particles and/or pseudo-single particles:secondary particles=80:20 weight ratio) of a lithium composite transition metal compound having contents of 93.3 mol % of Ni, 4.9 mol % of Co and 1.8 mol % of Mn among metals except for lithium, 1 part by weight of PVDF as a binder and including single particles and/or pseudo-single particles and secondary particles, and a CNT line dispersion including 0.8 parts by weight of CNT as a conductive material and 0.16 parts by weight of a dispersing agent based on 100 parts by weight of a cathode active material, was prepared. In this case, the single particles and/or pseudo-single particles were prepared with a size of D50=3 μm, and the secondary particles were prepared with a size of D50=7 μm by an airflow pulverization method. An aluminum foil having a thickness of 30 μm was coated with the composition for forming a cathode active material so as to have a thickness of 103 μm in a dry state, and then dried to manufacture a cathode.

A composition for forming an anode active material, including 97.7 parts by weight of graphite (artificial graphite:natural graphite=70:30 weight ratio, 90 parts by weight based on 100 parts by weight of the anode active material) and a silicon carbon composite (10 parts by weight based on 100 parts by weight of the anode active material), 1.15 parts by weight of styrene-butadiene rubber (SBR) as a binder and 1 part by weight of carboxymethyl cellulose (CMC) and further including a CNT line dispersion including 0.09 parts by weight of a dispersing agent and 0.06 parts by weight of a single-walled CNT, based on 100 parts by weight of the anode active material, was prepared. In this case, the silicon carbon composite was prepared with a size of D50=5 μm, and the graphite was prepared with a size of D50=17 μm by an airflow pulverization method. A copper foil having a thickness of 15 μm was coated with the composition for forming an anode active material so as to have a thickness of 86 μm in a dry state, and then dried to manufacture an anode.

The cathode and anode were stacked with a separator therebetween, and an electrolytic solution (1.0 MLiPF$_6$, ethylene carbonate (EC)/ethylmethyl carbonate (EMC)=30/70 (vol %), vinylene carbonate (VC) 1.5%) was injected to manufacture a battery.

Example 2

A cathode was manufactured in the same manner as in Example 1, except that based on 100 parts by weight of the cathode active material, the weight ratio of single particles and/or pseudo-single particles and secondary particles in the lithium composite transition metal compound was adjusted to 50:50.

Example 3

A cathode was manufactured in the same manner as in Example 1, except that based on 100 parts by weight of the cathode active material, the content of single particles and/or pseudo-single particles was 100 parts by weight.

Example 4

An anode was manufactured in the same manner as in Example 3, except that the silicon carbon composite included in the anode active material had a D50=9 μm.

Example 5

An anode was manufactured in the same manner as in Example 3, except that based on 100 parts by weight of the anode active material, the content of the silicon carbon composite was 5 parts by weight.

Example 6

An anode was manufactured in the same manner as in Example 1, except that the silicon carbon composite included in the anode active material had a D50=7 μm.

Example 7

A cathode was manufactured in the same manner as in Example 3, except that the single particles and/or pseudo-single particles included in the cathode active material had a D50=1 μm.

Example 8

A cathode and an anode were manufactured in the same manner as in Example 2, except that the single particles and/or pseudo-single particles and secondary particles included in the cathode active material had a D50=1 μm and 5 μm, respectively, and the silicon carbon composite included in the anode active material had a D50=3 μm.

Example 9

An anode was manufactured in the same manner as in Example 8, except that the graphite included in the anode active material had a D50=25 μm.

Example 10

A cathode and an anode were manufactured in the same manner as in Example 8, except that the secondary particles included in the cathode active material had a D50=7 μm, and the graphite included in the anode active material had a D50=13 μm.

Example 11

An anode was manufactured in the same manner as in Example 10, except that the graphite included in the anode active material had a D50=17 μm.

Example 12

An anode was manufactured in the same manner as in Example 10, except that the graphite included in the anode active material had a D50=25 μm.

Example 13

A cathode was manufactured in the same manner as in Example 10, except that the secondary particles included in the cathode active material had a D50=9 μm.

Example 14

An anode was manufactured in the same manner as in Example 13, except that the graphite included in the anode active material had a D50=17 μm.

Example 15

An anode was manufactured in the same manner as in Example 13, except that the graphite included in the anode active material had a D50=25 μm.

Example 16

A cathode was manufactured in the same manner as in Example 8, except that the secondary particles included in the cathode active material had a D50=15 μm.

Example 17

An anode was manufactured in the same manner as in Example 10, except that the silicon carbon composite included in the anode active material had a D50=5 μm.

Example 18

An anode was manufactured in the same manner as in Example 17, except that the graphite included in the anode active material had a D50=17 μm.

Example 19

An anode was manufactured in the same manner as in Example 17, except that the graphite included in the anode active material had a D50=25 μm.

Example 20

A cathode was manufactured in the same manner as in Example 18, except that the secondary particles included in the cathode active material had a D50=9 μm.

Example 21

A cathode and an anode were manufactured in the same manner as in Example 8, except that the secondary particles included in the cathode active material had a D50=3 μm, and the silicon carbon composite included in the anode active material had a D50=7 μm.

Example 22

An anode was manufactured in the same manner as in Example 21, except that the silicon carbon composite included in the anode active material had a D50=9 μm.

Example 23

An anode was manufactured in the same manner as in Example 21, except that the silicon carbon composite included in the anode active material had a D50=12 μm.

Example 24

A cathode and an anode were manufactured in the same manner as in Example 10, except that the single particles and/or pseudo-single particles included in the cathode active material had a D50=5 μm, and the silicon carbon composite included in the anode active material had a D50=7 μm.

Example 25

An anode was manufactured in the same manner as in Example 24, except that the graphite included in the anode active material had a D50=17 μm.

Example 26

An anode was manufactured in the same manner as in Example 24, except that the graphite included in the anode active material had a D50=25 μm.

Example 27

A cathode was manufactured in the same manner as in Example 24, except that the secondary particles included in the cathode active material had a D50=9 μm.

Example 28

An anode was manufactured in the same manner as in Example 27, except that the graphite included in the anode active material had a D50=17 μm.

Example 29

An anode was manufactured in the same manner as in Example 27, except that the graphite included in the anode active material had a D50=25 μm.

Example 30

A cathode was manufactured in the same manner as in Example 24, except that the secondary particles included in the cathode active material had a D50=15 μm.

Example 31

An anode was manufactured in the same manner as in Example 30, except that the graphite included in the anode active material had a D50=17 μm.

Example 32

An anode was manufactured in the same manner as in Example 30, except that the graphite included in the anode active material had a D50=25 μm.

Example 33

An anode was manufactured in the same manner as in Example 24, except that the silicon carbon composite included in the anode active material had a D50=9 μm.

Example 34

An anode was manufactured in the same manner as in Example 33, except that the graphite included in the anode active material had a D50=17 μm.

Example 35

An anode was manufactured in the same manner as in Example 33, except that the graphite included in the anode active material had a D50=25 μm.

Comparative Example 1

A cathode was manufactured in the same manner as in Example 1, except that based on 100 parts by weight of the cathode active material, the content of secondary particles included in the cathode active material was 100 parts by weight.

Comparative Example 2

A cathode was manufactured in the same manner as in Example 3, except that the single particles and/or pseudo-single particles included in the cathode active material had a D50=0.5 μm.

Comparative Example 3

A cathode was manufactured in the same manner as in Example 3, except that the single particles and/or pseudo-single particles included in the cathode active material had a D50=15 μm.

Comparative Example 4

An anode was manufactured in the same manner as in Example 3, except that the silicon carbon composite included in the anode active material had a D50=0.5 μm.

Comparative Example 5

An anode was manufactured in the same manner as in Example 3, except that based on 100 parts by weight of the anode active material, the content of graphite included in the anode active material was 100 parts by weight.

Comparative Example 6

An anode was manufactured in the same manner as in Example 3, except that based on 100 parts by weight of the anode active material, the content of SiO included in the anode active material was 10 parts by weight.

Comparative Example 7

A cathode was manufactured in the same manner as in Example 2, except that the single particles and/or pseudo-single particles included in the cathode active material had a D50=12 μm.

Comparative Example 8

A cathode and an anode were manufactured in the same manner as in Example 2, except that the single particles and/or pseudo-single particles included in the cathode active material had a D50=5 μm, and the silicon carbon composite included in the anode active material had a D50=3 μm.

Comparative Example 9

A cathode was manufactured in the same manner as in Example 2, except that the single particles and/or pseudo-single particles included in the cathode active material had a D50=10 μm.

Comparative Example 10

A cathode and an anode were manufactured in the same manner as in Example 2, except that the single particles and/or pseudo-single particles and secondary particles included in the cathode active material had a D50=9 μm and 14 μm, respectively, and the silicon carbon composite included in the anode active material had a D50=7 μm.

Comparative Example 11

A cathode was manufactured in the same manner as in Comparative Example 11, except that the single particles and/or pseudo-single particles included in the cathode active material had a D50=11 μm.

Comparative Example 12

A cathode and an anode were manufactured in the same manner as in Comparative Example 11, except that the single particles and/or pseudo-single particles included in the cathode active material had a D50=10 μm, and the silicon carbon composite included in the anode active material had a D50=9 μm.

Comparative Example 13

A cathode was manufactured in the same manner as in Comparative Example 13, except that the single particles and/or pseudo-single particles included in the cathode active material had a D50=12 μm.

<Experimental Example 1> Evaluation of Energy Density Characteristics

The energy densities of the manufactured batteries were evaluated, and are shown in the following Table 1.

The energy density of Example 1 was derived by the following calculations.

Measurement of cell volume (unit: L): width (100 mm)×length (300 mm)×thickness (8 mm)

Measurement of cell energy (unit: Wh): cell capacity (40 Ah)×average voltage (3.65 V)

Measurement of energy density (unit Wh/L): cell energy (Wh)/cell volume (L)=608 Wh/L

<Experimental Example 2> Evaluation of Service Life (Capacity Retention Rate) Characteristics The capacity retention rate was evaluated by charging and discharging the manufactured battery, and are shown in the following Table 1.

For the 1st and 2nd cycles, the battery was charged and discharged at 0.1 C, and from the 3rd cycle, the battery was charged and discharged at 0.5 C. The 100th cycle was completed in a charged state (with lithium contained in the anode).

Charging conditions: CC (constant current)/CV (constant voltage) (4.25 V/0.005 C current cut-off)

Discharging conditions: CC (constant current) conditions 2.5V

The charge retention rate was each derived by the following calculation.

Capacity retention rate (%)=(100 times discharge capacity/1 time discharge capacity)×100

The following Table 1 shows the values of the energy density (based on Example 1, %) and the capacity retention rate (100 cycles, %) of Examples 1 to 7 and Comparative Examples 1 to 13.

TABLE 1

|  | Cathode Single particles and/or pseudo-single particles: Secondary particles | Cathode single particles and/or pseudo-single particles D50 (μm) | Cathode Secondary particles D50 (μm) | Anode silicon carbon composite Content (wt. %) | Anode silicon carbon composite D50 (μm) | Anode graphite D50 (μm) | Energy density (Based on Example 1, %) | Capacity retention rate (100 cycles, %) |
|---|---|---|---|---|---|---|---|---|
| Example 1 | 80:20 | 3 | 7 | 10 | 5 | 17 | 100 | 94 |
| Example 2 | 50:50 | 3 | 7 | 10 | 5 | 17 | 104 | 96 |
| Example 3 | 100:0 | 3 | — | 10 | 5 | 17 | 110 | 97 |
| Example 4 | 100:0 | 3 | — | 10 | 9 | 17 | 109 | 97 |
| Example 5 | 100:0 | 3 | — | 5 | 5 | 17 | 107 | 98 |
| Example 6 | 80:20 | 3 | 7 | 10 | 7 | 17 | 100 | 95 |
| Example 7 | 100:0 | 1 | — | 10 | 5 | 17 | 97 | 91 |
| Comparative Example 1 | 0:100 | — | 7 | 10 | 5 | 17 | 90 | 81 |
| Comparative Example 2 | 100:0 | 0.5 | — | 10 | 5 | 17 | 98 | 83 |
| Comparative Example 3 | 100:0 | 15 | — | 10 | 5 | 17 | 97 | 85 |
| Comparative Example 4 | 100:0 | 3 | — | 10 | 0.5 | 17 | 99 | 82 |

TABLE 1-continued

| | Cathode Single particles and/or pseudo-single particles: Secondary particles | Cathode single particles and/or pseudo-single particles D50 (μm) | Cathode Secondary particles D50 (μm) | Anode silicon carbon composite Content (wt. %) | Anode silicon carbon composite D50 (μm) | Anode graphite D50 (μm) | Energy density (Based on Example 1, %) | Capacity retention rate (100 cycles, %) |
|---|---|---|---|---|---|---|---|---|
| Comparative Example 5 | 100:0 | 3 | — | 0 | — | 17 | 91 | 78 |
| Comparative Example 6 | 100:0 | 3 | — | 10 (Application of SiO) | 5 | 17 | 87 | 82 |
| Comparative Example 7 | 50:50 | 12 | 7 | 10 | 5 | 17 | 91 | 74 |
| Comparative Example 8 | 50:50 | 5 | 7 | 10 | 3 | 17 | 90 | 75 |
| Comparative Example 9 | 50:50 | 10 | 7 | 10 | 5 | 17 | 91 | 75 |
| Comparative Example 10 | 50:50 | 9 | 14 | 10 | 7 | 17 | 91 | 73 |
| Comparative Example 11 | 50:50 | 11 | 14 | 10 | 7 | 17 | 91 | 73 |
| Comparative Example 12 | 50:50 | 10 | 14 | 10 | 9 | 17 | 90 | 74 |
| Comparative Example 13 | 50:50 | 12 | 14 | 10 | 9 | 17 | 91 | 74 |

The following Table 2 shows the energy densities (based on Example 1, %) and capacity retention rates (100 cycles, %) of Examples 8 to 35 based on the content of cathode single particles and/or pseudo-single particles:secondary particles=50:50 and anode silicon carbon composite:graphite=10:90.

TABLE 2

| | Cathode single particles and/or pseudo-single particles D50 (μm) | Cathode Secondary particles D50 (μm) | Anode silicon carbon composite D50 (μm) | Anode graphite D50 (μm) | Energy density (Based on Example 1, %) | Capacity retention rate (100 cycles, %) |
|---|---|---|---|---|---|---|
| Example 8 | 1 | 5 | 3 | 17 | 105 | 91 |
| Example 9 | 1 | 5 | 3 | 25 | 105 | 91 |
| Example 10 | 1 | 7 | 3 | 13 | 105 | 93 |
| Example 11 | 1 | 7 | 3 | 17 | 105 | 93 |
| Example 12 | 1 | 7 | 3 | 25 | 105 | 93 |
| Example 13 | 1 | 9 | 3 | 13 | 104 | 93 |
| Example 14 | 1 | 9 | 3 | 17 | 104 | 93 |
| Example 15 | 1 | 9 | 3 | 25 | 104 | 93 |
| Example 16 | 1 | 15 | 3 | 17 | 101 | 91 |
| Example 17 | 1 | 7 | 5 | 13 | 105 | 94 |
| Example 18 | 1 | 7 | 5 | 17 | 105 | 94 |
| Example 19 | 1 | 7 | 5 | 25 | 105 | 94 |
| Example 20 | 1 | 9 | 5 | 17 | 104 | 93 |
| Example 21 | 1 | 3 | 7 | 17 | 105 | 95 |
| Example 22 | 1 | 3 | 9 | 17 | 105 | 94 |
| Example 23 | 1 | 3 | 12 | 17 | 104 | 93 |
| Example 24 | 5 | 7 | 7 | 13 | 104 | 96 |
| Example 25 | 5 | 7 | 7 | 17 | 104 | 96 |
| Example 26 | 5 | 7 | 7 | 25 | 103 | 96 |
| Example 27 | 5 | 9 | 7 | 13 | 103 | 96 |
| Example 28 | 5 | 9 | 7 | 17 | 103 | 96 |
| Example 29 | 5 | 9 | 7 | 25 | 103 | 96 |
| Example 30 | 5 | 15 | 7 | 13 | 102 | 94 |
| Example 31 | 5 | 15 | 7 | 17 | 102 | 94 |
| Example 32 | 5 | 15 | 7 | 25 | 102 | 94 |
| Example 33 | 5 | 7 | 9 | 13 | 104 | 96 |
| Example 34 | 5 | 7 | 9 | 17 | 104 | 96 |
| Example 35 | 5 | 7 | 9 | 25 | 104 | 96 |

It is characterized in that the lithium composite transition metal compound included in the cathode active material according to the present disclosure includes single particles and/or pseudo-single particles having an average particle diameter (D50) of 1 μm or more, the anode active material includes a silicon carbon composite having an average particle diameter (D50) of more than 1 μm, and the average particle diameter (D50) of the single particles is smaller than the average particle diameter (D50) of the silicon carbon composite. The single particles and/or pseudo-single particles and the silicon carbon composite have a particle size distribution with an appropriate average particle diameter (D50) to suppress side reactions with the electrolytic solution and facilitate charge/discharge, so that there is an effect in which the energy density is increased and service life characteristics are stable because the capacity/efficiency is properly implemented.

In Examples 1 to 35, cathode and anode active materials satisfying the particle size range according to the present disclosure were used, and it could be confirmed that the energy density and capacity retention rate are excellent.

In contrast, in Comparative Examples 1 and 5, the single particles included in the cathode active material and the silicon carbon composite included in the anode active material of the present disclosure were not included, and it could be confirmed that the energy density and capacity retention rate deteriorated.

In Comparative Examples 2, the range of the average particle diameter (D50) of the single particles and/or pseudo-single particles included in the cathode active material of the present disclosure was not satisfied, and it could be confirmed that the overall particle size was too small resulting in low life performance and difficulty in charging and discharging, resulting in a decrease in capacity, efficiency, and life compared to the Examples.

In addition, in Comparative Examples 3 and 8 to 14, the average particle diameter (D50) of the single particles and/or pseudo-single particles was larger than the average particle diameter (D50) of the silicon carbon composite included in the anode active material, and it could be confirmed that the capacity, efficiency and service life deteriorated.

In Comparative Examples 4, the range of the average particle diameter (D50) of the silicon carbon composite included in the anode active material of the present disclosure was not satisfied, and it was confirmed that the overall particle size was too small resulting in low life performance and difficulty in charging and discharging, resulting in a decrease in capacity, efficiency, and life compared to the Examples.

That is, in Comparative Example 4, the average particle diameter (D50) of the silicon carbon composite is smaller than 1 μm, which increases the specific surface area, resulting in a decrease in the service life performance by reacting with the electrolyte as the cycle progresses, and since the D50 of the silicon carbon composite is smaller than the D50 of the single particles and/or pseudo-single particles, the capacity, efficiency, and service life are decreased.

Comparative Example 6 does not include the silicon carbon composite included in the anode active material used in the present disclosure, but includes the SiO composite, and it could be confirmed that the energy density and the capacity retention rate deteriorated.

What is claimed is:

1. A lithium secondary battery comprising:
a cathode having a cathode active material;
an anode having an anode active material;
a separator disposed between the cathode and the anode; and
an electrolyte,
wherein the cathode active material comprises a lithium composite transition metal compound comprising nickel (Ni), cobalt (Co) and manganese (Mn),
wherein the lithium composite transition metal compound comprises at least one of single particles or pseudo-single particles having an average particle diameter (D50) of 1 μm or more, wherein each single particle consists of one nodule, wherein each pseudo-single particle is a composite of 30 or fewer nodules,
wherein the anode active material comprises a silicon carbon composite, wherein the silicon carbon composite has an average particle diameter (D50) of more than 1 μm,
wherein the average particle diameter (D50) of the at least one of single particles or pseudo-single particles is 2 μm to 11 μm smaller than the average particle diameter (D50) of the silicon carbon composite,
wherein the lithium composite transition metal compound further comprises secondary particles,
wherein the anode active material further comprises graphite,
wherein the average particle diameter (D50) of the silicon carbon composite is 9 μm to 23 μm smaller than the average particle diameter (D50) of the graphite, and
wherein the graphite is present in an amount of 70 parts by weight to 97 parts by weight based on 100 parts by weight of the anode active material.

2. The lithium secondary battery of claim 1, wherein the average particle diameter (D50) of the at least one of the single particles or pseudo-single particles is 12 μm or less, and
wherein the average particle diameter (D50) of the silicon carbon composite is less than 15 μm.

3. The lithium secondary battery of claim 1, wherein the average particle diameters (D50) of the secondary particles, the at least one of single particles or pseudo-single particles, the graphite, and the silicon carbon composite are represented by A, B, C and D, respectively, and wherein B<D≤A<C.

4. The lithium secondary battery of claim 1, wherein the average particle diameters (D50) of the at least one of single particles or pseudo-single particles, the graphite, and the silicon carbon composite are represented by B, C and D, respectively, B<D<C.

5. The lithium secondary battery of claim 1, wherein the cathode active material further comprises aluminum.

6. The lithium secondary battery of claim 1, wherein the at least one of single particles or pseudo-single particles is present in an amount of 15 parts by weight to 100 parts by weight based on 100 parts by weight of the cathode active material, and
wherein the silicon carbon composite is present in an amount of 3 parts by weight to 30 parts by weight based on 100 parts by weight of the anode active material.

7. The lithium secondary battery of claim 1, wherein the lithium composite transition metal compound comprises 80 mol % or more of nickel relative to the other metals except for lithium.

8. The lithium secondary battery of claim 1, wherein the cathode further comprises a cathode binder and a conductive material.

9. The lithium secondary battery of claim 1, wherein the lithium secondary battery is a cylindrical battery.

10. The lithium secondary battery of claim 1, wherein a ratio of the average particle diameter (D50) of the at least one of single particles or pseudo-single particles to the average particle diameter (D50) of the silicon carbon composite range from 1.5:2 to 1.5:20.

11. The lithium secondary battery of claim 1, wherein the cathode further comprises a cathode active material layer having the cathode active material, the anode further comprises an anode active material layer having the anode active material, and the cathode and anode active material layers have a thickness of 10 μm or more and 500 μm or less, respectively.

12. The lithium secondary battery of claim 1, wherein the cathode further comprises a cathode active material layer having the cathode active material, a loading amount per unit volume of the cathode active material layer is 250 mg/25 cm2 to 900 mg/25 cm2, and the anode further comprises an anode active material layer having the anode active material, and a loading amount per unit volume of the anode active material layer is 100 mg/25 cm2 to 600 mg/25 cm2.

13. The lithium secondary battery of claim 1, wherein the lithium secondary battery has an energy density of 400 Wh/L to 900 Wh/L.

14. A battery module comprising the lithium secondary battery according to claim 1.

15. A battery pack comprising the battery module of claim 14.

16. The lithium secondary battery of claim 1, wherein the average particle diameter (D50) of the silicon carbon composite ranges from 3 μm to 9 μm.

17. The lithium secondary battery of claim 1, wherein the average particle diameter (D50) of the graphite ranges from 17 μm to 25 μm.

18. The lithium secondary battery of claim 1, wherein the average particle diameter (D50) of the single particles or pseudo-single particles ranges from 1 μm to 8 μm.

19. The lithium secondary battery of claim 1, wherein the average particle diameter (D50) of the single particles or pseudo-single particles ranges from 1 μm to 5 μm.

20. The lithium secondary battery of claim 1, wherein the at least one of single particles or pseudo-single particles is present in an amount of more than 50 parts by weight to 100 parts by weight based on 100 parts by weight of the cathode active material.

* * * * *